United States Patent Office 2,866,725
Patented Dec. 30, 1958

2,866,725

COATED EVAPORATING ELEMENTS AND METHOD OF UTILIZING SAME

Paul Alexander, Princeton, N. J., assignor, by mesne assignments, to Continental Can Company, Inc., New York, N. Y., a corporation of New York No Drawing. Application March 15, 1954
Serial No. 416,436

13 Claims. (Cl. 117—228)

This invention relates to coating in vacuum by continuous evaporation of metals. By "continuous evaporation," as distinct from "batch coatings," I mean any method in which the metal is evaporated during a prolonged period and the objects or materials to be coated are passed through the zone of the metal vapor. In the "batch coating" methods, a number of distinct objects are coated by placing them around sources of evaporation and these objects are coated in the operation in which the evaporation of the metal takes only a few seconds; whilst in the "continuous coating" the metal is evaporated continuously during a period of up to several hours. This can be done essentially in two general ways. One way is to evaporate the metal from a container or crucible which is heated to the required temperature; and the other way is to feed the metal continuously or intermittently onto an evaporating element which is kept at the required temperature. In practice, the continuous feeding method has proved to be more successful because of such advantages as the absence of limitation on the quantity of metal to be evaporated, simplicity of heating, constant rate of evaporation, and others. Some metals are highly reactive at high temperatures and are solvents for practically all metals and most other materials. Amongst such metals are aluminum, which is commercially the most important one for evaporation, titanium, zirconium, chromium, and others. In the case of these metals, the most important and most difficult problem is to find a material which is suitable to constitute the evaporating element and last long enough, without being dissolved, or rendered ineffective by the metal to be evaporated from it.

In the first process, which has gained practical importance and which is described in my prior Patent No. 2,153,786, dated April 11, 1939, a tungsten rod was used as an evaporating element for aluminum. Tungsten as an evaporating element has many advantages, in having a high melting point, in being easily wetted by aluminum, and simple to heat by electric current, but as it is not insoluble in aluminum at high temperatures, such elements do not last longer than one hour under the most favorable conditions.

Carbon is another eminently suitable material for an evaporating element because of its high melting point and low vapor pressure, and because it is easily and economically fabricated. However, aluminum combines with carbon at high temperatures, forming aluminum carbide and many other metals are similarly carbide forming. A carbon evaporator, such, for instance, as is described in patent to Bancroft, No. 2,557,530, dated June 19, 1951, or any other shape of carbon container, is of very limited use for the evaporation of aluminum and some other metals, because the formation of aluminum carbide or the carbides of the other metals, which occurs after very brief periods of use, retards the evaporation of aluminum or of the other metals, and in a short time destroys the element.

It has been suggested to cover the surface of a carbon element with a carbide of titanium, zirconium or of some other metals in order to form a protective barrier between the aluminum and the carbon and prevent the formation of aluminum carbide. However, the protection so provided is very limited and though such a protected carbon element is superior to bare carbon, its lasting qualities, and therefore its utilitarian life, are not satisfactory enough.

In pending patent specifications, Serial Numbers 208,162, and now Patent No. 2,756,166, and 291,506, and now Patent No. 2,822,301, carbon elements are described which are protected with two layers, one layer being titanium or zirconium carbide and the top layer being essentially free metallic titanium or zirconium. Thus, the carbide coating acts as a barrier between the carbon and the metallic titanium or zirconium from which the aluminum is evaporated. Some aluminum diffuses through the titanium or zirconium reaching the carbide and the carbon, and therefore the life of such an evaporating element is of limited duration, but nevertheless the protection provided is much better than that of the carbides alone; and such elements are durable enough for many practical purposes.

According to the present invention a very superior protection can be achieved by covering the surface of a carbon base of appropriate shape, first with a thin sheet of metal which is secured to the carbon base by a suitable binder, the metal sheet being of one of the following metals: tungsten, molydenum, tantalum or niobium, and subsequently covering the surface of the metal sheet with a silicide of the metal. Such an element thus consists of a carbon core or body covered by a metal sheet which should be not less than .05 mm. thick, and the surface of this metal sheet is transformed into its own silicide. These layers on the carbon surface efficiently protect the carbon for a long period during the evaporation of aluminum and other highly reactive metals.

The superiority of such elements is shown in that I have found that more aluminum can be evaporated from a unit area of its surface before it becomes inoperative or ineffective, than from any other types of evaporating elements suggested or used heretofore.

A comparison of the amounts of aluminum which can be evaporated from the unit area of a number of evaporating elements before they become ineffective is shown in the following table, the last figure being for an element of the type here disclosed:

| Element | Gr. of aluminum evaporated per cm.$^2$ of surface |
|---|---|
| Tungsten rod according to Pat. 2,153,786 | 1.1 |
| Bare carbon | .5 |
| Titanium carbide coated carbon | 3.9 |
| Zirconium carbide coated carbon with free zirconium metal on top. Ratio ZrC:Zr-10:90 | 9.00 |
| Carbon element covered with tungsten silicide coated tungsten sheet, sheet being .003" thickness | 21.6 |

The method of preparing such elements is quite simple. The area of the surface from which aluminum is to be evaporated is covered with the metal sheet. The surface of the carbon is then coated with an appropriate binding composition. For the binder, I prefer to use a suspension of silicon powder in acetone, alcohol, or some other suitable liquid. The metal sheet is secured onto this area with mechanical means, e. g. a copper wire. Thereupon, the surface of the metal sheet is coated with a suspension of silicon, or granulated silicon is laid upon it, if the surface is horizontal. The element is then heated in a vacuum to a temperature exceeding 2400° C. and kept at this temperature for a short period until all surplus silicon and the copper of the wire have evaporated. Alternatively, instead of the application of silicon powder or granules, either copper-silicide or a mixture of copper-silicide and silicon can be applied with equally good results. The end product of such a method is an evaporating element consisting of a carbon base overlaid in the desired locations with a coating which is bound to the carbon base, the coating having an inner zone which is a metal from the group, tungsten, molybdenum, tantalum and niobium, and an outer zone which consists of the silicide of one of those metals.

While I have described my invention specifically, it is apparent that changes or modifications may be made therein without departing from the spirit of the invention. For example, I have mentioned only the metals tungsten, molybdenum, tantalum and niobium, but other metals can be used as well, the limitation being that the metal should form a stable silicide, both metal and silicide having a melting point above 1500° C. Thus, thorium, hafnium or zirconium might be used in addition to those metals already enumerated.

I claim:

1. An evaporating element for use in a vacuum metallizing apparatus, said element having a carbon base, a metal layer comprised substantially of a metal selected from the group consisting of tungsten, molybdenum, tantalum, and niobium being secured to said base by a binder and a surface layer comprised substantially of a silicide of a metal of said group fused to said metal layer.

2. An evaporating element for use in a vacuum metallizing apparatus, said element having a carbon base, a metal layer comprised substantially of a metal selected from the group consisting of tungsten, molybdenum, tantalum, and niobium being secured to said base by a silicide binder, and a surface layer comprised substantially of a silicide of a metal of said group fused to said metal layer.

3. An evaporating element for use in a vacuum metallizing apparatus, said element having a carbon base, a metal layer comprised substantially of tungsten being secured to said base by a binder, and a surface layer comprised substantially of tungsten silicide fused to said metal layer.

4. An evaporating element for use in a vacuum metallizing apparatus, said element having a carbon base, a metal layer comprised substantially of molybdenum being secured to said base by a binder, and a surface layer comprised substantially of molybdenum silicide fused to said metal layer.

5. An evaporating element for use in a vacuum metallizing apparatus, said element having carbon base, a metal layer comprised substantially of tantalum being secured to said base by a binder, and a surface layer comprised substantially of tantalum silicide fused to said metal layer.

6. An evaporating element for use in a vacuum metallizing apparatus, said element having a carbon base, a metal layer comprised substantially of niobium being secured to said base by a binder, and a surface layer comprised substantially of niobium silicide fused to said metal layer.

7. The method of preparing an evaporating element for use in a vacuum metallizing apparatus comprising the application of a binder to the surface of a carbon base, the subsequent placing of a sheet of a metal selected from the group consisting of tungsten, molybdenum, tantalum and niobium upon said binder, one surface of said sheet being then exposed, then applying silicon particles to said exposed surface, and finally raising the temperature of said element in a vacuum to a temperature sufficiently high that said metal and silicon will combine to form a silicide of said metal, said element being held at said temperature for a period of sufficient duration that excess silicon is evaporated.

8. The method for preparing an evaporating element for use in a vacuum metallizing apparatus comprising the application of a binder to the surface of a carbon base, the subsequent placing of a sheet of a metal selected from the group consisting of tungsten, molybdenum, tantalum and niobium upon said binder, one surface of said sheet being then exposed, then applying copper silicide particles to said exposed surface, then raising the temperature of said element in a vacuum to a temperature sufficiently high that said metal and said copper silicide will combine to form a silicide of said metal, and subsequent heating of said element in a vacuum to a temperature sufficiently high to remove excess copper.

9. A method for depositing a metal film on a surface in which the vapor of the metal to be deposited is created by evaporation in a vacuum of the metal from an evaporating element having a carbon base, a metal layer comprised substantially of a metal selected from the group consisting of tungsten, molybdenum, tantalum and niobium being secured to said base by a binder, and a surface layer comprised substantially of a silicide of a metal of said group fused to said metal layer, said surface being exposed to said vapor in vacuum.

10. A method for depositing a metal film on a surface in which the vapor of the metal to be deposited is created by evaporation in a vacuum of the metal from an evaporating element having a carbon base, a metal layer comprised substantially of tungsten being secured to said base by a binder, and a surface layer comprised substantially of tungsten silicide fused to said metal layer, said surface being exposed to said vapor in vacuum.

11. A method for depositing a metal film on a surface in which the vapor of the metal to be deposited is created by evaporation in a vacuum of the metal from an evaporating element having a carbon base, a metal layer comprised substantially of molybdenum being secured to said base by a binder, and a surface layer comprised substantially of molybdenum silicide fused to said metal layer, said surface being exposed to said vapor in vacuum.

12. A method for depositing a metal film on a surface in which the vapor of the metal to be deposited is created by evaporation in a vacuum of the metal from an evaporating element having a carbon base, a metal layer comprised substantially of tantalum being secured to said base by a binder, and a surface layer comprised substantially of tantalum silicide fused to said metal layer, said surface being exposed to said vapor in vacuum.

13. A method for depositing a metal film on a surface in which the vapor of the metal to be deposited is created by evaporation in a vacuum of the metal from an evaporating element having a carbon base, a metal layer comprised substantially of niobium being secured to said base by a binder, and a surface layer comprised sustantially of niobium silicide fused to said metal layer, said surface being exposed to said vapor in vacuum.

References Cited in the file of this patent

UNITED STATES PATENTS

| | | |
|---|---|---|
| 1,249,637 | Keyes | Dec. 11, 1917 |
| 1,312,257 | King | Aug. 5, 1919 |
| 2,597,964 | Winter | May 2, 1952 |
| 2,612,442 | Goetzel | Sept. 30, 1952 |
| 2,614,947 | Heyroth | Oct. 21, 1952 |
| 2,665,475 | Campbell et al. | Jan. 12, 1954 |
| 2,745,932 | Glaser | May 15, 1956 |